Figure 1:
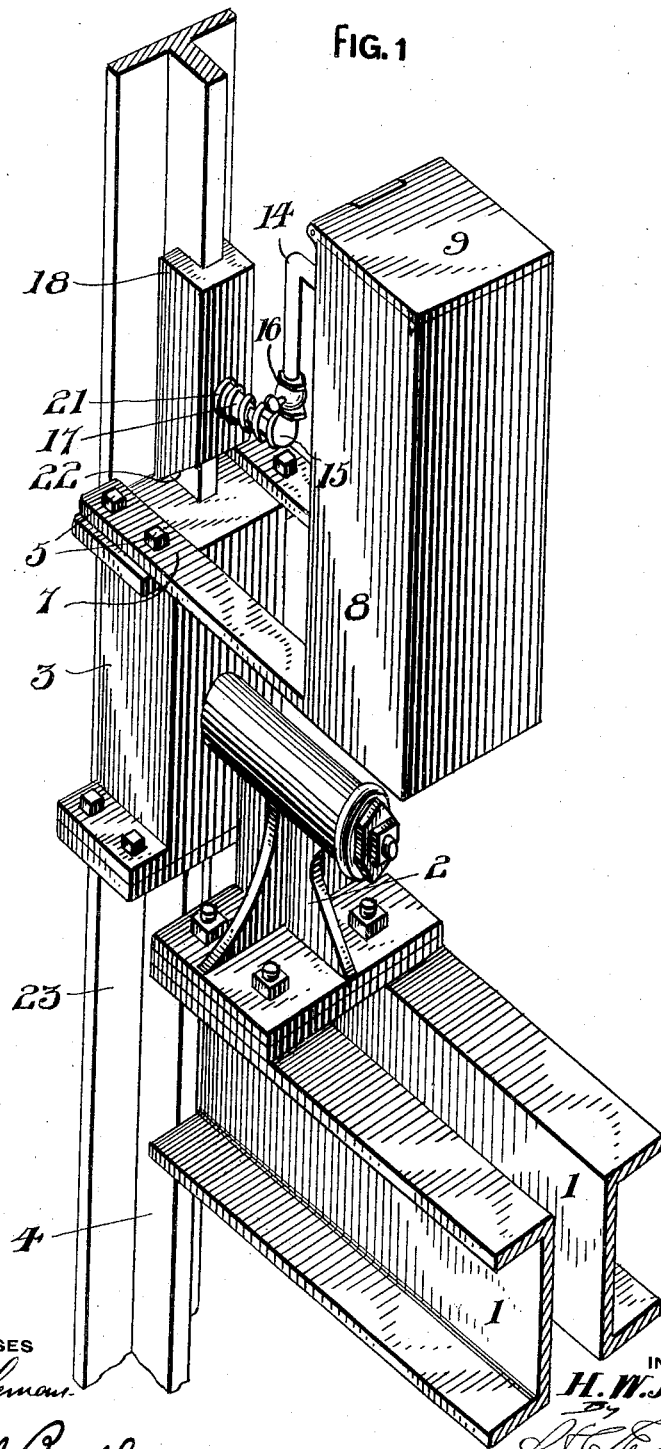

H. W. A. WELLENS.
LUBRICATOR.
APPLICATION FILED OCT. 28, 1912.

1,067,852.

Patented July 22, 1913.
2 SHEETS—SHEET 1.

WITNESSES

INVENTOR
H. W. A. Wellens

ATTORNEYS

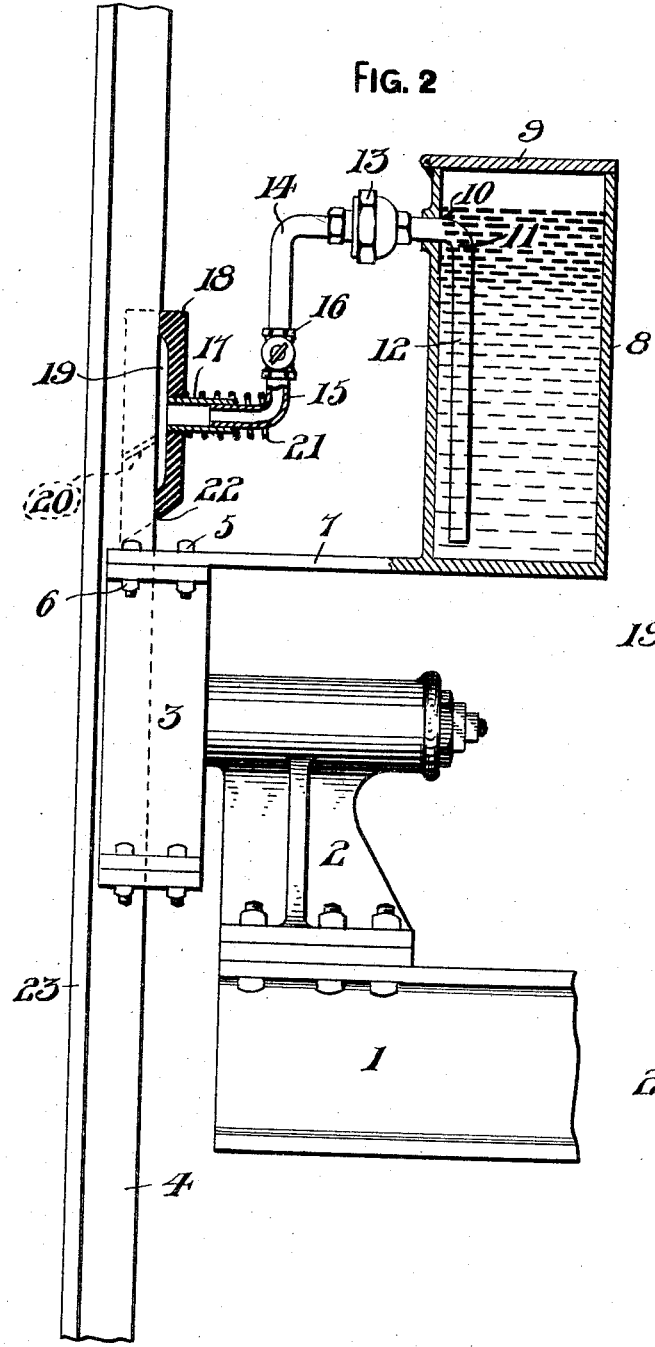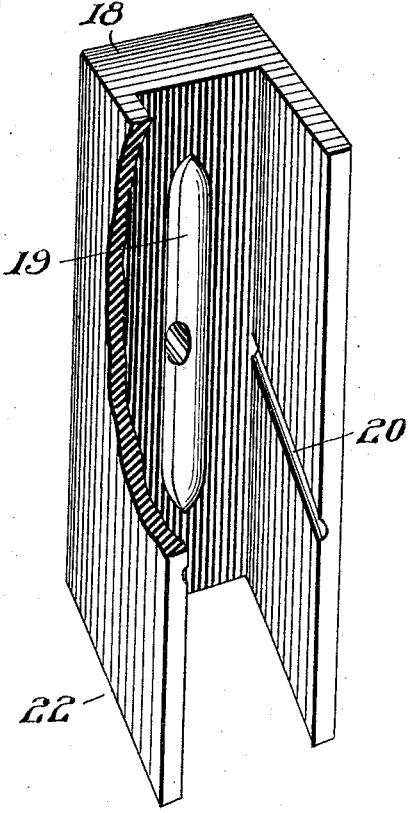

UNITED STATES PATENT OFFICE.

HARRY W. A. WELLENS, OF PITTSBURGH, PENNSYLVANIA.

LUBRICATOR.

1,067,852. Specification of Letters Patent. Patented July 22, 1913.

Application filed October 28, 1912. Serial No. 728,086.

*To all whom it may concern:*

Be it known that I, HARRY W. A. WELLENS, a citizen of the United States of America, residing at Pittsburgh, in the county of Allegheny and State of Pennsylvania, have invented certain new and useful Improvements in Lubricators, of which the following is a specification, reference being had therein to the accompanying drawing.

This invention relates to lubricators, and more particularly to a lubricator adapted to be carried by a movable body for supplying oil or other lubricant to a guide for said body.

The primary object of my invention is to furnish an elevator with an automatic lubricator for supplying a lubricant to the guide rail of the elevator without the lubricant being wasted or the lubrication of the rail impaired by grit or other foreign matter.

Another object of this invention is to provide a lubricator for elevator rails that has novel yieldable and self-adjusting lubricant head that insures an even and uniform application of lubricant to the guide rail of the elevator and reduces the wear and tear upon shoes to a minimum.

A further object of this invention is to provide a vacuum fed and pressure lubricator in connection with which a heavy oil can be used and automatically supplied to a rail without excessive lubrication and waste.

A still further object of this invention is to accomplish the above results by a lubricator consisting of comparatively few parts, inexpensive to manufacture, easy to install and regulate, and highly efficient for the purposes for which it is intended.

With the above and other objects in view the invention resides in the novel construction, combination and arrangement of parts, to be hereinafter specifically described and then claimed.

Reference will now be had to the drawings, wherein:—

Figure 1 is a perspective view of the lubricator in connection with the guide rail of an elevator, Fig. 2 is a vertical sectional view of the same, and Fig. 3 is an enlarged perspective view of a lubricating head, partly broken away.

In describing my invention by aid of the drawings above referred to, I desire to point out that I intend said views simply as illustrative of an example whereby my invention may be applied in practice, and I do not limit my claims to the precise arrangements and constructions of parts indicated. The following description is therefore to be construed broadly as including substitute arrangements and constructions which are the obvious equivalents of those shown.

The drawings show a portion of an elevator beam 1 having the end thereof provided with a support 2 for a shoe holder 3 containing a shoe for guiding an elevator relatively to a rail 4. These elements are of the ordinary and well known type such as used in connection with the various elevators.

Secured to the top of the shoe holder 3 by bolts 5, nuts 6 or other fastening means are brackets 7 supporting a lubricant reservoir 8 that has the top thereof provided with a hinged or detachable lid or cover 9. The reservoir 8 and the brackets 7 thereof can be made integral and of a light and durable metal, as aluminum.

The side of the reservoir 8 confronting the rail 4 is provided with an opening 10 in which is mounted the elbow 11 of a down pipe 12, said pipe having the lower end thereof in proximity to the bottom of the reservoir. The outer end of the pipe is provided with a swivel connection 13 of a conventional form and connected to said swivel and in communication with the down pipe 12 is a feed pipe 14 that has the lower end thereof provided with an elbow 15 extending toward the rail 4. The feed pipe 14 above the elbow 15 is provided with a conventional form of needle or regulating valve 16 that can be adjusted to control the passage of lubricant through the feed pipe.

Slidably mounted upon and telescoping the end of the elbow 15 is a connecting pipe 17 that supports a channel-shaped lubricating head 18, preferably made of fiber or a non-fusible and durable material. This head rides against the front and lateral faces of the rail 4 and said head has the inner wall thereof provided with a longitudinal vacuum chamber 19 and the side walls provided with angularly disposed grooves 20. The vacuum chamber 19 is in communication with the connecting pipe 17 and encircling said pipe and the end of the elbow 15 is a coiled compression spring 21 that holds the head 18 normally in engagement with the rail 4. The spring 21 allows the head to yield and said spring compensates for the vibrations set up between an elevator cage and the guide when the elevator is in motion.

I prefer to bevel the lower end of the head or lubricating cup as at 22 so that the lubricant on the lateral faces of the guide rail will not be carried ahead of the cup as the latter moves downward, but will be carried toward the front face of the rail. In other words, the lubricant upon the rail is retained thereon until it reaches the bottom of the rail where it can be collected, strained and used for various purposes.

In operation, the valve 16 is regulated to control the flow of lubricant into the vacuum chamber 19. With an elevator in motion there is an atmospheric pressure of 14.7 pounds per square inch upon the lubricant within the reservoir 8, and a vacuum or suction is created in the chamber 19 which continuously draws off a quantity of the lubricant and places the same upon the rail 4 while the elevator is in motion. The grooves 20 insure an equal distribution of the lubricant on the sides of the rail and the flow of lubricant is not impaired by the accumulation of grit and foreign matter.

The swivel 13 permits of lateral adjustment of the lubricating head and with the reservoir held stationary relatively to the elevator or movable body, the lubricating head can readily adjust itself to the guide for the elevator.

I am aware of lubricators wherein wicks and porous bodies depend upon capillary attraction for feeding a lubricant to an elevator guide, but considerable trouble is experienced by grit and other foreign matter impairing the use of a wick. Furthermore, it is necessary to use a light oil and there is considerable waste.

My invention obviates the necessity of resorting to the use of wicks and porous bodies and as the lubricant has a clear passage from the reservoir to the lubricating head it is obvious that I can use a heavy oil and evenly apply and distribute the same upon the guide rail. In actual practice, the speed of an elevator is increased, grit grinding eliminated and the movement of the elevator made practically noiseless.

What I claim is:—

1. In a vacuum-operated lubricator for guide-members, the combination of a reservoir for fluid lubricant, a feed pipe extending into the reservoir with its inlet end arranged near the bottom of the reservoir and its outlet end disposed below the level of the lubricant in the reservoir, a lubricating-cup yieldingly-mounted on the outlet end of said pipe to engage the front and lateral faces of a guide-member, said cup having a vacuum chamber in that face which engages the front face of the guide-member, the vacuum formed in said chamber producing a siphonage feed of the lubricant to the guide member, and means in said pipe between the cup and reservoir permitting lateral movement of the cup independently of the reservoir.

2. In a vacuum-operated lubricator for guide-members, an oil reservoir, a feed pipe extending into the reservoir and having its inlet end near the bottom of the reservoir, said pipe leading out of the reservoir at a point near the top thereof and having its outlet disposed below the level of the oil in said reservoir, a lubricating cup yieldingly-mounted on the outlet end of the feed pipe and capable of reciprocable movement independently of the reservoir, the said cup having a recess in the face engaging the front face of the guide-member forming a vacuum chamber whereby the oil is automatically siphoned from the reservoir as the lubricating cup is reciprocated.

In testimony whereof I affix my signature in the presence of two witnesses.

HARRY W. A. WELLENS.

Witnesses:
HARRY H. JAMES,
KARL H. BUTLER.

Copies of this patent may be obtained for five cents each, by addressing the "Commissioner of Patents, Washington, D. C."